(12) United States Patent
Spears et al.

(10) Patent No.: US 6,940,063 B2
(45) Date of Patent: Sep. 6, 2005

(54) OPTICAL IMAGE SCANNER WITH VARIABLE FOCUS

(75) Inventors: Kurt E. Spears, Fort Collins, CO (US); Steven L. Webb, Murrieta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 229 days.

(21) Appl. No.: 09/919,008

(22) Filed: Jul. 31, 2001

(65) Prior Publication Data

US 2003/0025947 A1 Feb. 6, 2003

(51) Int. Cl.[7] ............................................... G02B 27/40
(52) U.S. Cl. ...................... 250/234; 358/474; 358/497
(58) Field of Search ............................ 250/234, 208.1, 250/201.1, 201.2; 358/473–476, 482–484, 497, 427

(56) References Cited

U.S. PATENT DOCUMENTS

| | | | |
|---|---|---|---|
| 5,278,677 A | * | 1/1994 | Lee et al. .................... 358/498 |
| 5,362,958 A | * | 11/1994 | Ando ...................... 250/208.1 |
| 5,453,784 A | | 9/1995 | Krishman et al. .......... 348/348 |
| 5,616,909 A | | 4/1997 | Arackellian |
| 5,742,326 A | | 4/1998 | Matsui et al. |
| 5,898,171 A | | 4/1999 | McConica et al. .......... 250/234 |
| 6,188,465 B1 | | 2/2001 | Rees et al. |
| 6,495,812 B1 | * | 12/2002 | Wurm et al. ............. 250/201.1 |

FOREIGN PATENT DOCUMENTS

| | | | |
|---|---|---|---|
| EP | 0027373 A1 | | 4/1981 |
| EP | 0946040 A1 | | 9/1999 |
| GB | 2155270 A | | 9/1985 |
| JP | 63-222573 A | * | 9/1988 |
| JP | 2260760 A | | 10/1990 |
| JP | 5063910 A | | 3/1993 |
| JP | 07-327109 A | * | 12/1995 |
| JP | 11-341219 A | * | 12/1999 |

* cited by examiner

Primary Examiner—Thanh X. Luu
(74) Attorney, Agent, or Firm—Augustus W. Winfield

(57) ABSTRACT

A scanner has an optical head that includes lenses and a photosensor array. The distance of the optical head, relative to a surface of a platen, is variable. As a result, the primary focal point for the lenses can be moved relative to a surface of the platen. The primary focal point can be continuously variable, or the primary focal point can be selected from one of multiple alternative primary focal points.

2 Claims, 5 Drawing Sheets

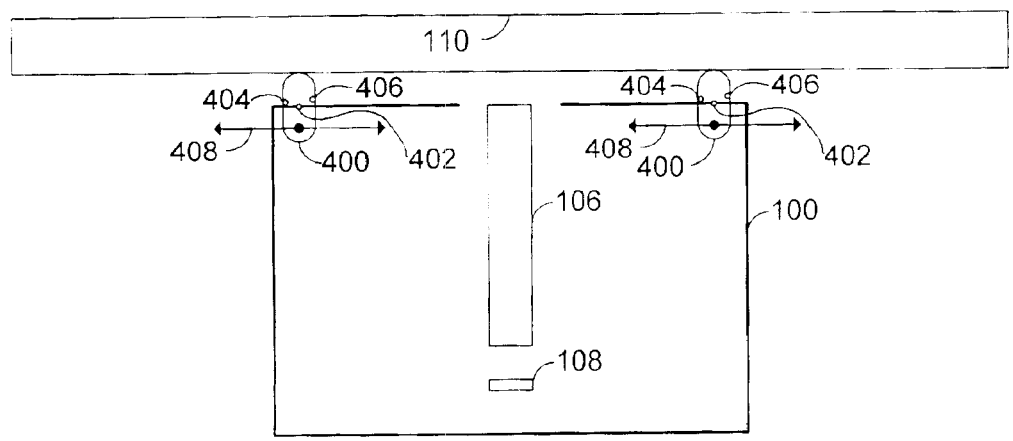
FIG. 4A
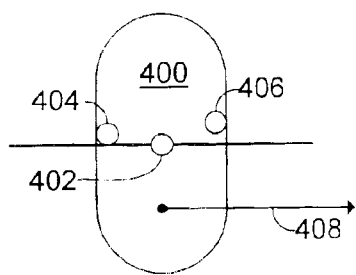 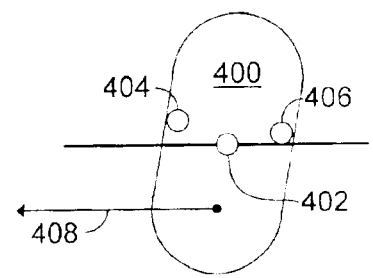
FIG. 4B  FIG. 4C

OPTICAL IMAGE SCANNER WITH VARIABLE FOCUS

FIELD OF INVENTION

This invention relates generally to optical image scanners.

BACKGROUND OF THE INVENTION

Image scanners, also known as document scanners, convert a visible image on a document or photograph, or an image in a transparent medium, into an electronic form suitable for copying, storing or processing by a computer. An image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices. Transparency image scanners pass light through a transparent image, for example a photographic positive slide, through optics, and then onto an array of photosensitive devices. The optics focus at least one line, called a scanline, on the image being scanned, onto the array of photosensitive devices. The photosensitive devices convert received light intensity into an electronic signal. An analog-to-digital converter converts the electronic signal into computer readable binary numbers, with each binary number representing an intensity value.

There are two common types of image scanners. In a first type, a single spherical reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays (available from Nippon Sheet Glass Co.), in which an array of rod-shaped lenses is used, typically with multiple photosensors receiving light through each individual lens.

Depth of focus is the amount by which an image may be shifted along the optical path with respect to some reference plane and introduce no more than a specified acceptable blur. The depth of focus for lens arrays is commonly relatively short relative to scanners using a single spherical reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.5 mm above the surface of the platen. As a result, slides may be slightly out of focus when using lens arrays that are focused at the surface of the platen. Another example is scanning books or magazines where part of a page being scanned curves into a binding spline, causing part of the surface being scanned to be positioned above the transparent platen. A large depth of focus is needed to sharply image the binding spline.

For the specific example of slides, it is known to insert and remove an additional optical glass plate in the optical path when switching between objects on the surface of the platen and the slide film which is above the platen. However, this approach introduces aberrations, since the lens can compensate for aberrations for only one of the two conditions.

There is a general need for scanners to have an ability to scan objects that are on the surface of a platen, and also scan objects that are some distance away from the surface of the platen.

SUMMARY OF THE INVENTION

A scanner has an optical head that includes lenses and a photosensor array. The distance of the optical head, relative to a surface of a platen, is variable. As a result, the primary focal point for the lenses can be moved relative to a surface of the platen. The primary focal point can be continuously variable, or the primary focal point can be selected from one of multiple alternative primary focal points.

BRIEF DESCRIPTION OF THE DRAWINGS

FIG. 4A is a block diagram cross section side view of part of a scanner with multiple alternative primary focal points in accordance with a fourth example embodiment of the invention.

FIGS. 4B and 4C are magnified views of pivoting pads on the scanner of FIG. 4A, illustrating two alternative positions of the pads.

DETAILED DESCRIPTION OF THE PREFERRED EMBODIMENT OF THE INVENTION

Figure 1:
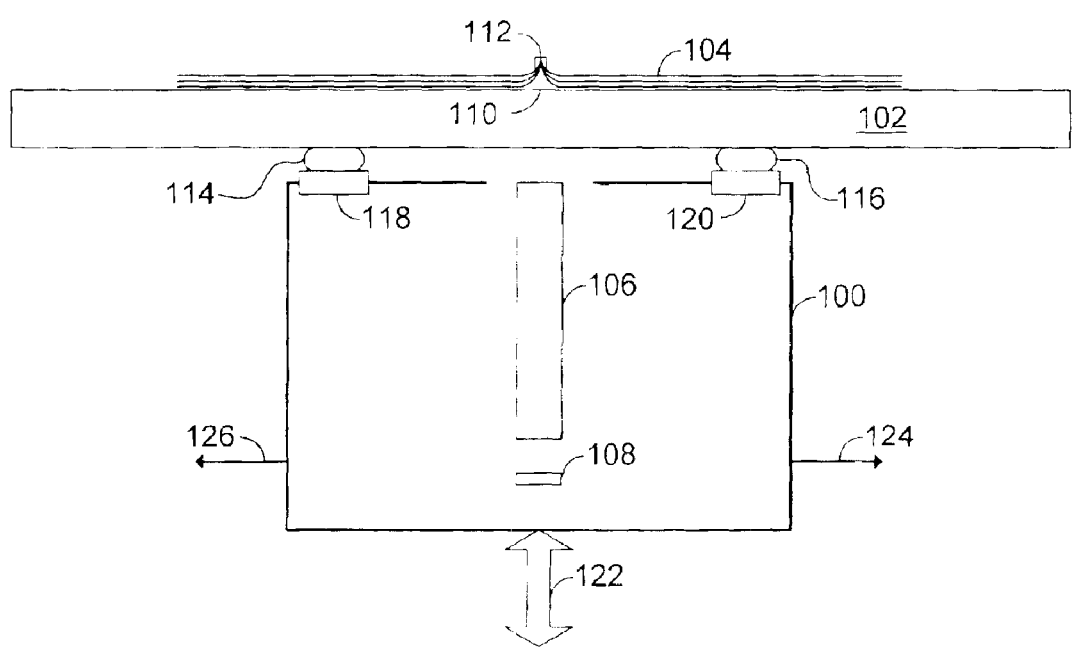
FIG. 1 is a block diagram cross section side view of part of a scanner with a continuously variable primary focal point in accordance with a first example embodiment of the invention.

FIG. 1 illustrates a first example embodiment of the invention. Sizes of some objects in FIG. 1 are exaggerated to facilitate illustration. In FIG. 1, an optical head 100 (also known as a carriage), is positioned beneath a transparent platen 102. Documents may be placed on the top surface of the platen (indicated by reference number 110) for scanning. In FIG. 1, a bound publication 104 is placed onto the platen. The optical head 100 includes a lens array 106, and a photosensor array 108. The invention is equally applicable to optical heads using reduction lenses, but is particularly useful for lens arrays, where the depth of focus is relatively short. In FIG. 1, the lens array 106 is depicted as oriented perpendicular to the platen 102. Alternatively, the lens array may be oriented parallel to the platen, with one or more mirrors in the optical path to direct light through the lenses and onto the photosensor array. Orientation of the lens array is not relevant to the invention.

For documents placed on the top surface of the platen, the primary focal point of the lens array 106 is at the top surface (110) and the secondary focal point is at the photosensor array 108. However, the pages of the publication 104 bend into a spline 112 where the pages are bound, so that a portion of the image of interest may be substantially further away from the lens array 106, and the photosensor array 108, than the top surface of the platen (110). As a result, part of the image of interest on the publication 104 may be out of focus.

It is common in scanners using lens arrays to reference the optical head from the bottom surface of the platen. For example, in FIG. 1, the optical head is forced upward (along the axis indicated by arrow 122) toward the platen, and the distance from the platen is maintained by pads 114 and 116. Scanning is accomplished by translating the optical head relative to the document, typically by using cables, as indicated by reference numbers 124 and 126. The pads are commonly low-friction. In prior art designs, pads such as pads 114 and 116 keep the optical head a fixed distance from the platen. In accordance with a first example embodiment of the invention, the distance between the platen and the optical head is continuously variable. In the example of FIG. 1, the pads 114 and 116 are separated from the optical head 100 by piezoelectric elements 118 and 120. By applying a variable voltage across the piezoelectric elements 118 and 120, the thickness of the elements (along the axis indicated by arrow 122) can be made variable. The optical head 100 may then be translated (using cables 124 and 126), past the publication 104, multiple times, each time with the optical head (and the photosensor array) at a slightly different distance (different voltage across elements 118 and 120) from the platen. The multiple images may be combined to form a single composite image that is focused everywhere. Alternatively, for each different scan, corresponding scanlines may be analyzed for contrast, and the scanline having the highest contrast may be selected. Alternatively, if an object is at a known distance from the platen, for example a 35 mm slide, a single scan may be made with a primary focal point appropriate for the particular object.

Figure 2A:
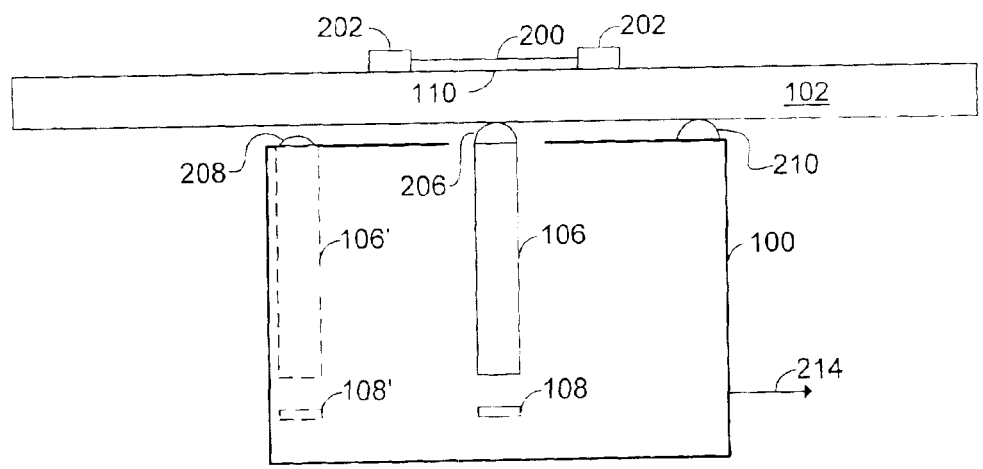
FIGS. 2A and 2B are block diagram cross section side views of part of a scanner with multiple alternative primary focal points in accordance with a second example embodiment of the invention.
Figure 2B:
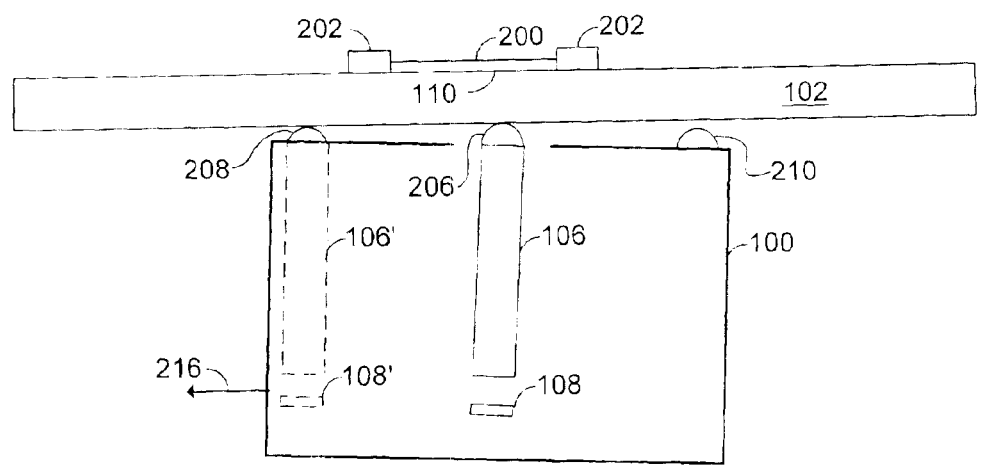
Figure 2C:
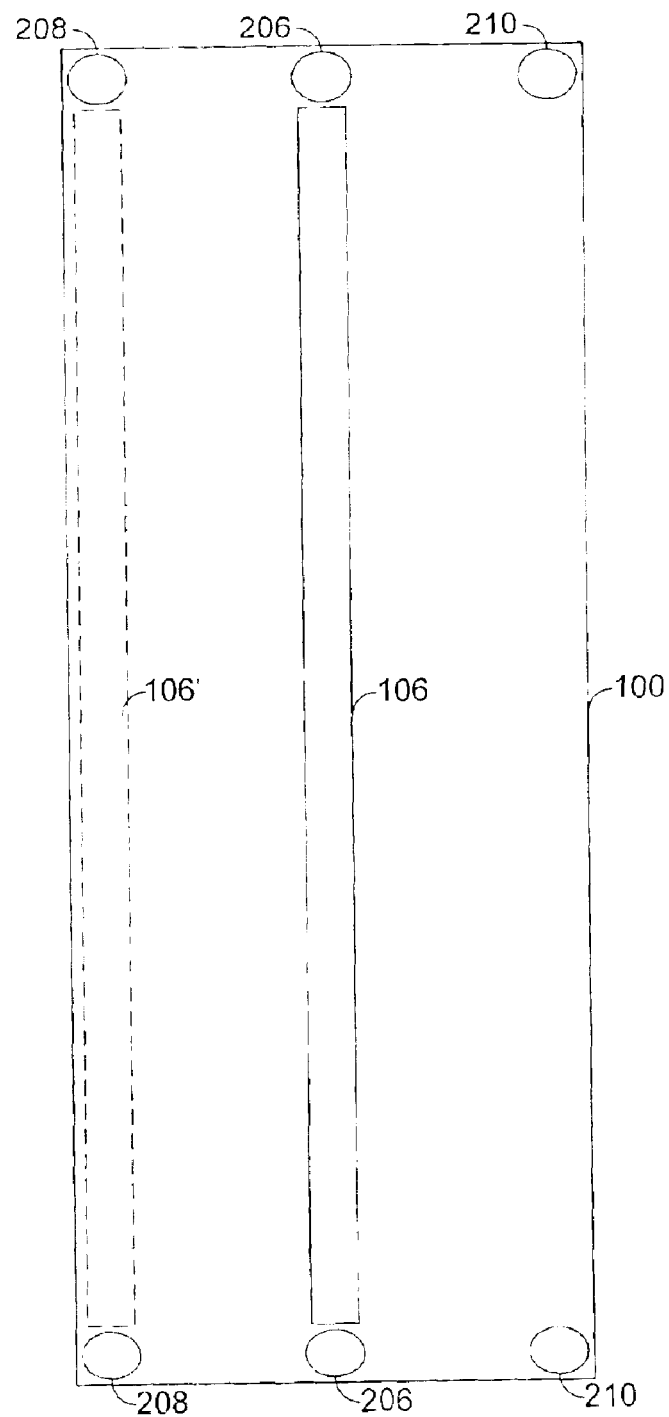
FIG. 2C is a block diagram top view of the scanner of FIGS. 2A and 2B.

FIGS. 2A–2C illustrate an alternative embodiment, with multiple alternative primary focal points. In FIG. 2A, a 35 mm slide with film 200 and frame 202 is on the platen 102. The frame 202 holds the film 200 about 0.5 mm above the top surface (110) of the platen. In the embodiment illustrated in FIGS. 2A–2C, translation of the optical head in one direction results in a primary focal point at the surface of a slide, and translation of the optical head in the opposite direction results in a primary focal point at the top of the platen. In FIG. 2A, the optical head has three sets of pads, 206, 208, and 210. FIG. 2C shows the relationship of the pads in a top view. Pads 206 and 210 are thicker than pads 208. For purposes of example only, pads 206 and 210 are illustrated as having the same thickness. The optical head is permitted to pivot on pads 206, and pads 206 provide sufficient friction to cause the optical head to pivot when translated. When the optical head is translated by a cable 214 in FIG. 2A, the optical head pivots on pads 206 so that pads 210 contact the bottom surface of the platen, and pads 208 do not contact the bottom surface of the platen. When the optical head is translated in the opposite direction, for example, by cable 216 in FIG. 2B, the optical head pivots on pads 206 so that pads 208 contact the bottom surface of the platen, and pads 210 do not contact the bottom surface of the platen. If pads 206 and 210 are the same thickness, then for the configuration illustrated, when the optical head is translated to the right as in FIG. 2A, the lens array 212 is vertical relative to the top surface of the platen. When the optical head is translated to the left as in FIG. 2B, the lens array 212 is tilted relative to the top surface of the platen. As a result, the photosensor array is closer to the top surface of the platen in FIG. 2A than in FIG. 2B. The primary focal point of the lens array may be at the top surface of the platen in FIG. 2B, and above the top surface of the platen in FIG. 2A. When scanning a slide or other object slightly above the top surface of the platen, the optical head is translated in one direction as in FIG. 2A. When scanning a document or other object on the top surface of the platen, the optical head is translated in the opposite direction as in FIG. 2B.

If desired, the displacement of the lens array relative to the top surface of the platen can be amplified by moving the lens array to one end of the optical carriage, away from the fulcrum point. This is illustrated in FIGS. 2A, 2B, and 2C, by illustrating alternative locations of the lens array (indicated by reference number 106') and photosensor array (indicated by reference number 108').

Figure 3A:
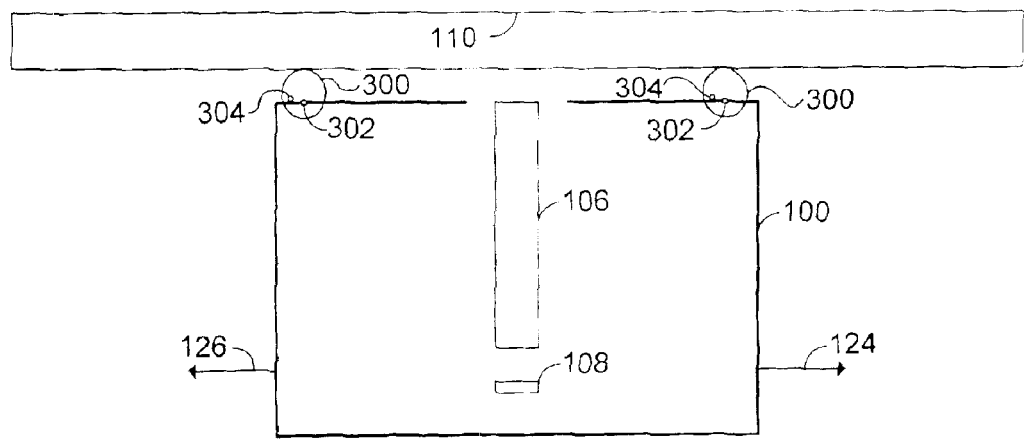
FIG. 3A is a block diagram cross section side view of part of a scanner with multiple alternative primary focal points in accordance with a third example embodiment of the invention.
Figures 3B, 3C:
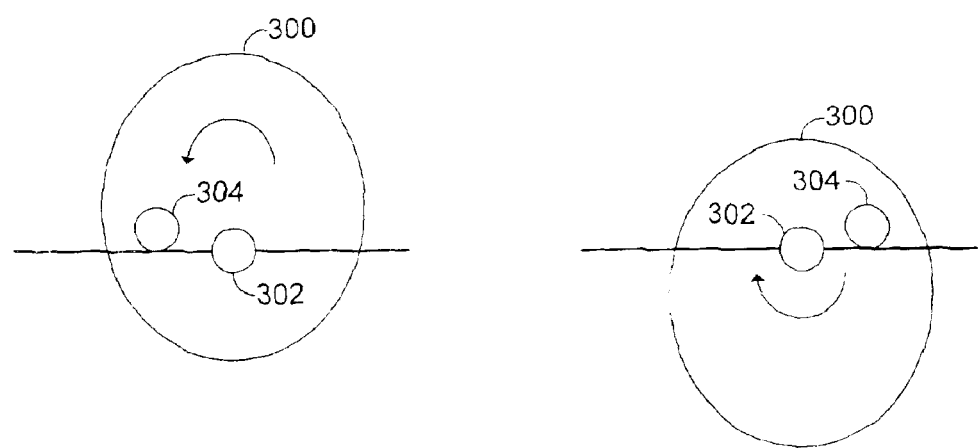
FIGS. 3B and 3C are magnified views of pivoting pads on the scanner of FIG. 3A, illustrating two alternative positions of the pads.

FIG. 3A illustrates an alternative embodiment, using pivoting pads. In FIG. 3A, two pads 300 are attached to the optical head at pivot points 302. The pivoting motion is stopped by pins 304 that contact the optical head. In FIG. 3B, if motion is to the right (cable 124 in FIG. 3A), the pads 300 rotate counterclockwise until the pins 304 contact the optical head. In FIG. 3C, if motion is to the left (cable 126 in FIG. 3A), the pads 300 rotate clockwise until the pins 304 contact the optical head. Because of the asymmetrical cam shape of the pads 300, the lens array (and the photosensor array) is closer to the top surface of the platen in FIG. 3C than in FIG. 3B. The primary focal point of the lens array may be at the top surface of the platen in FIG. 3B, and above the top surface of the platen in FIG. 3C. When scanning a slide or other object slightly above the top surface of the platen, the optical head is translated as in FIG. 3C. When scanning a document or other object on the top surface of the platen, the optical head is translated as in FIG. 3B.

FIG. 4A illustrates still another alternative embodiment using pivoting pads. In the embodiments illustrated in FIGS. 2A and 3A, some pad friction is needed to cause the optical head to tilt (FIG. 2A) or to cause the pads to pivot (FIG. 3A). In the embodiment of FIG. 4A, the cable is attached directly to the pivoting pads, so the pads can be made with very low friction if desired. In FIG. 4A, pads 400 are attached to the optical head at pivot points 402. Rotation is limited by pins 404 and 406. In FIG. 4B, if the optical head is pulled to the right, the pads 400 rotate counterclockwise until pins 404 contact the optical head. In FIG. 4C, if the optical head is pulled to the left, the pads 400 rotate clockwise until pins 406 contact the optical head. The lens array (and photosensor array) is closer to the top surface of the platen in FIG. 4C than in FIG. 4B. The primary focal point of the lens array may be at the top surface of the platen in FIG. 4B, and above the top surface of the platen in FIG. 4C. When scanning a slide or other object slightly above the top surface of the platen, the optical head is translated as in FIG. 4C. When scanning a document or other object on the top surface of the platen, the optical head is translated as in FIG. 4B.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A scanner, comprising:

a platen;

an optical head;

pads positioned between the optical head and the platen, each pad pivoting around a pivot point, where for a first direction of travel of the optical head the pads pivot to a first position, and for a second direction of travel of the optical head the pads pivot to a second position, and where the distance between the platen and the optical head is different for the first and second positions of the pads.

2. A scanner comprising:

a platen;

a photosensor array, the photosensor array being translated substantially parallel to the platen, where a first direction of translation causes the photosensor array to be displaced from the platen a first distance, and where a second direction of translation causes the photosensor array to be displaced from the platen a different distance, where the difference in distance is predefined.

* * * * *